Dec. 6, 1955 G. RENKE 2,725,631
DOUBLE PRONGED FORK
Filed March 16, 1953

INVENTOR.
Gus Renke
BY
Zoltan Holocheky
ATTORNEY.

United States Patent Office 2,725,631
Patented Dec. 6, 1955

2,725,631

DOUBLE PRONGED FORK

Gus Renke, New York, N. Y.

Application March 16, 1953, Serial No. 342,357

2 Claims. (Cl. 30—322)

This invention relates to culinary articles and more particularly to a dual pronged fork.

A principal object of the present invention is to provide a fork device for firmly holding an article of food such as meats, fowl or other food from slipping, twisting or oscillating while such food is being lifted from a pan or the like, or while being transported or carved.

Another object of the invention is to provide a fork device which can readily be inserted into an article of food of any shape, at several spaced points, with a single movement, and without binding so that the fork device may be readily removed without tearing the food.

A further object of the invention is to provide an elongated fork device which is adapted to engage an article of food at both ends and is provided with a balanced hand grip between its ends.

It is further proposed to construct a dual pronged fork which is sanitary, simple and durable in construction and which can be manufactured and sold at a reasonable cost.

For a further comprehension of the invention and of the objects and advantages thereof, reference will be had to the following description and accompanying drawing and to the appended claims in which the various novel features of the invention are more particularly set forth.

In the accompanying drawing forming a material part of this disclosure:

Figure 1:
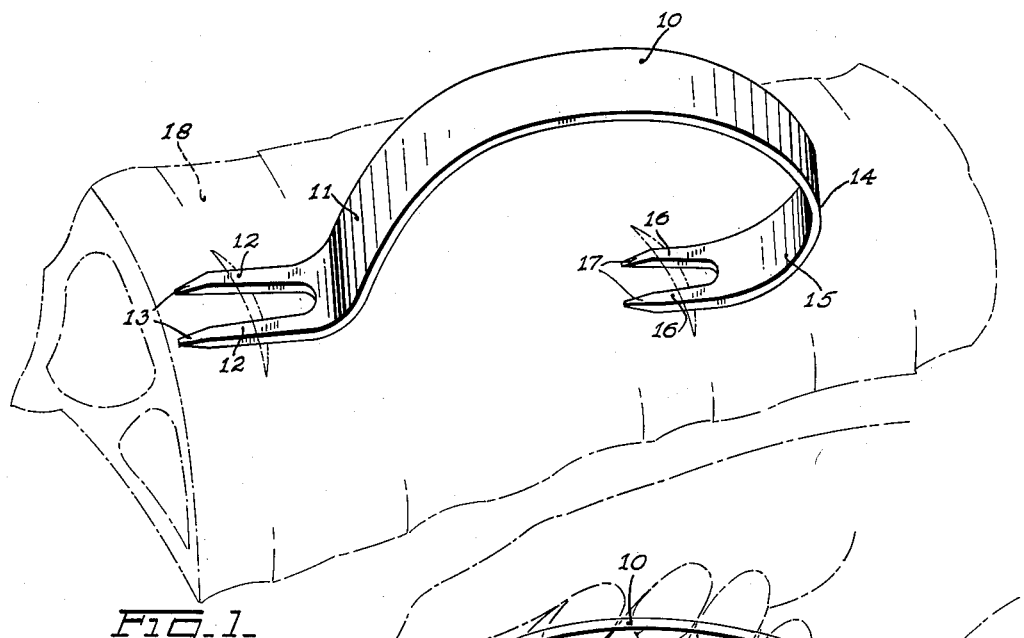
Fig. 1 is a perspective view of a dual pronged fork embodying one form of the invention in position on an article of food.
Figure 2:
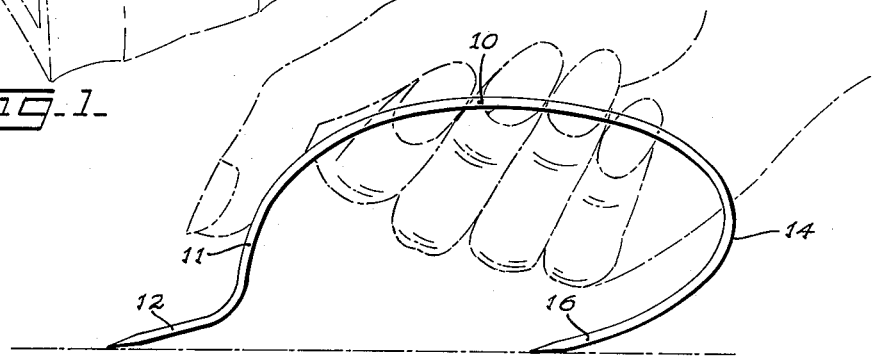
Fig. 2 is a side elevational view of the dual pronged fork of Fig. 1.

In Figs. 1 and 2, a fork embodying the preferred form of the invention is shown as comprising an elongated arcuate-shaped body 10 of flat metal. At its front end, the body is somewhat flattened to form an extension 11 which is bent downwardly and outwardly at an angle of approximately 15° to the horizontal as shown in Fig. 2. The extension is formed with two spaced prongs 12 having pointed ends 13. The rear end of the body 10 is formed with a substantially sharp curved portion 14 which terminates in an extension 15 bent at an angle of approximately 15° to the horizontal. Extension 15 extends in the same direction as extension 11 and is formed with two spaced prongs 16 with pointed ends 17. All of the prongs point in the same direction and the points thereof are disposed on approximately the same horizontal plane.

The body 10 of the fork is of a shape to permit the fingers of the hand to readily encircle it as shown in Fig. 2, with the thumb positioned on the upper surface of the slanting extension 11 and the small fingers of the hand pocketed inside the rear curved end 14 and impinging thereagainst, so that a firm grip is afforded. By merely exerting a forward and downward hand pressure, the fork can readily be inserted into an article of food such as indicated at 18 in Fig. 1, and can just as readily be extracted without tearing the food.

It will be seen that the individual prongs of the front and rear sets are placed well apart from each other, and that the front set is positioned quite a distance from the rear set. Such an arrangement of prongs gives a four-point engagement forming preferably a rectangle. This gives a type of holding which eliminates rolling, twisting and oscillating of the material which is being cut, treated or acted upon.

Figure 3:
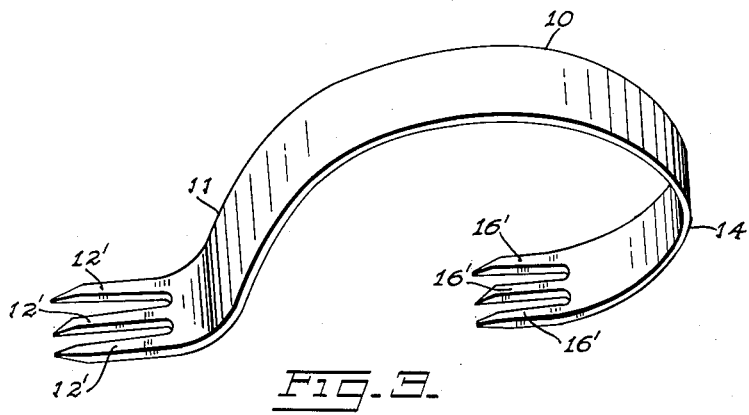
Fig. 3 is a perspective view of a dual pronged fork embodying a modified form of the invention.

The modified form of fork shown in Fig. 3 has three prongs 12' at its front end, and three prongs 16' at its rear end instead of two at each end as in the form of Fig. 1. This form is especially suitable and useful for larger articles of food.

In all other respects the form of the invention shown in Fig. 3 is similar to that shown in Fig. 1 and similar reference numerals are used to indicate similar parts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention what I claim and desire to secure by United States Letters Patent is:

1. A fork device comprising a substantially arcuate-shaped elongated body of flat metal having a slightly flattened front end having a forward extension, said extension constituting a pair of spaced pointed prongs disposed at an angle of approximately 15° to the horizontal, said body having a curved rear end having a downwardly and forwardly directed extension, said latter extension constituting a pair of spaced elongated pointed prongs disposed at an angle of approximately 15° to the horizontal, said extensions projecting in the same direction, the points of said spaced prongs being disposed on approximately the same plane.

2. A fork device comprising a substantially arcuate-shaped elongated body of flat metal having a slightly flattened front end having a forward extension, said extension constituting pointed prongs disposed at a slight angle to the horizontal said body having a curved rear end with a forwardly directed extension, said latter extension constituting spaced elongated prongs disposed at a slight angle to the horizontal, said extensions projecting in the same direction.

References Cited in the file of this patent

UNITED STATES PATENTS

| | | |
|---|---|---|
| D. 158,933 | Cassidy | June 13, 1950 |
| 2,007,237 | Adams | July 9, 1935 |
| 2,496,062 | Morfesi | Jan. 31, 1950 |